Figure 1:
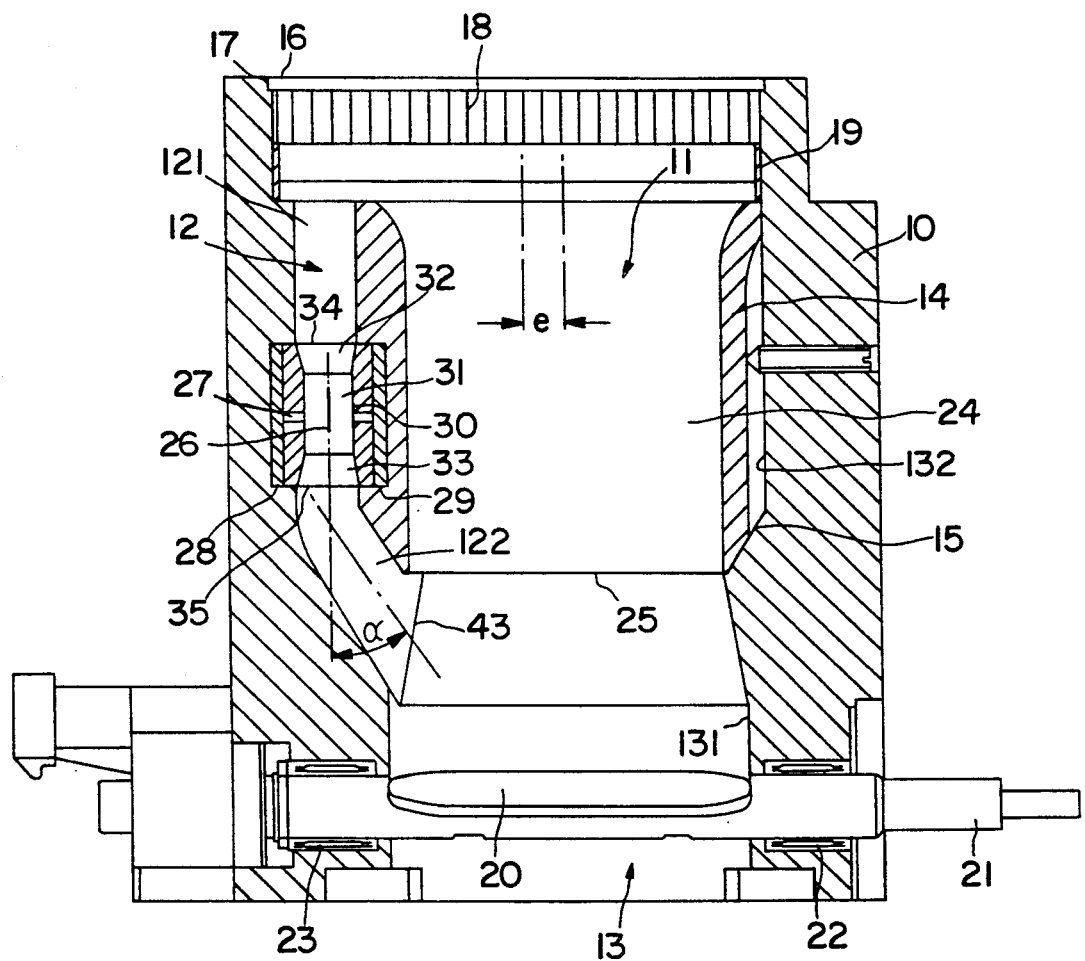

United States Patent [19]

Peters et al.

[11] Patent Number: 5,167,147
[45] Date of Patent: Dec. 1, 1992

[54] AIR-MEASURING DEVICE

[75] Inventors: Klaus-Juergen Peters, Affalterbach-Birkhau; Walter Bosch, Waiblingen; Hans-Peter Stiefel, Ditzingen; Karl Gmelin, Flein; Kurt Frank, Schorndorf-Haubersbronn; Thomas Schwegel, Ditzingen-Heimerdingen, all of Fed. Rep. of Germany

[73] Assignee: Robert Bosch GmbH, Stuttgart, Fed. Rep. of Germany

[21] Appl. No.: 656,079

[22] PCT Filed: Jun. 8, 1990

[86] PCT No.: PCT/DE90/00439
§ 371 Date: Mar. 1, 1991
§ 102(e) Date: Mar. 1, 1991

[87] PCT Pub. No.: WO91/00987
PCT Pub. Date: Jan. 24, 1991

[30] Foreign Application Priority Data

Jul. 8, 1989 [DE] Fed. Rep. of Germany ....... 3922489

[51] Int. Cl.$^5$ ............................................. G01M 19/00
[52] U.S. Cl. .................................. 73/118.2; 73/204.21
[58] Field of Search ............. 73/118.2, 204.13, 204.21; 123/494

[56] References Cited

U.S. PATENT DOCUMENTS 4,418,568 12/1983 Surman ..................... 73/204.21 X
4,612,895 9/1986 Kuroiwa et al. .................. 123/494

FOREIGN PATENT DOCUMENTS 212820 9/1988 Japan ..................... 73/118.2

Primary Examiner—Jerry W. Myracle
Attorney, Agent, or Firm—Edwin E. Greigg; Ronald E. Greigg

[57] ABSTRACT

An air-measuring device for measuring the air mass taken in by an internal combustion engine which has a main flow channel, having a venturi section, and a temperature-dependent measuring resistor arranged in a bypass channel, the bypass channel opening upstream and downstream of the smallest flow cross-section of the venturi section in the direction of flow, in order to reduce the noise component in the measurement signal of the measuring resistor a channel region with an inlet and outlet opening is formed in the bypass channel, which channel region accommodates the measuring resistor in a central portion. The channel region is designed in such a way that the ratio of the flow cross-section of the central portion to the smallest cross-section of the venturi section is from 1:8 to 1:25 and the ratio of the cross-section to the cross-section of the inlet and outlet opening is in each case from 1:1 to 1:2.

15 Claims, 3 Drawing Sheets

AIR-MEASURING DEVICE

PRIOR ART

The invention starts from an air-measuring device as set forth hereinafter.

Such air-measuring devices are known, for example, from DE 32 00 507 A1, U.S. Pat. No. 4,494,405, DE 29 14 275 C2, EP 0 087 621 B1 or EP 0 054 887 B1. The temperature-dependent measuring resistor used there, for example a hot wire or hot film, changes its electrical resistance as a function of the change of the air flow in the bypass channel. The output signal of the measuring resistor is thus a measure of the air flow rate in the main flow channel. In such air-measuring devices, the signals picked up across the measuring resistor are in part very noisy, making an expensive electronic signal processing system necessary in order to obtain sufficiently accurate measured values.

ADVANTAGES OF THE INVENTION

In contrast, the air-measuring device according to the invention, has the advantage that the noise component superposed on the actual measured value signal is considerably reduced and the measured value signal is largely unaffected by structural conditions in the air-measuring device.

In particular, in an air-measuring device having a function characteristic or a characteristic shape with sufficiently high resolution is obtained In an air-measuring device having the influence of the different opening angles of the throttle valve on the measured value signal is n particular eliminated.

DRAWING

Figure 2:
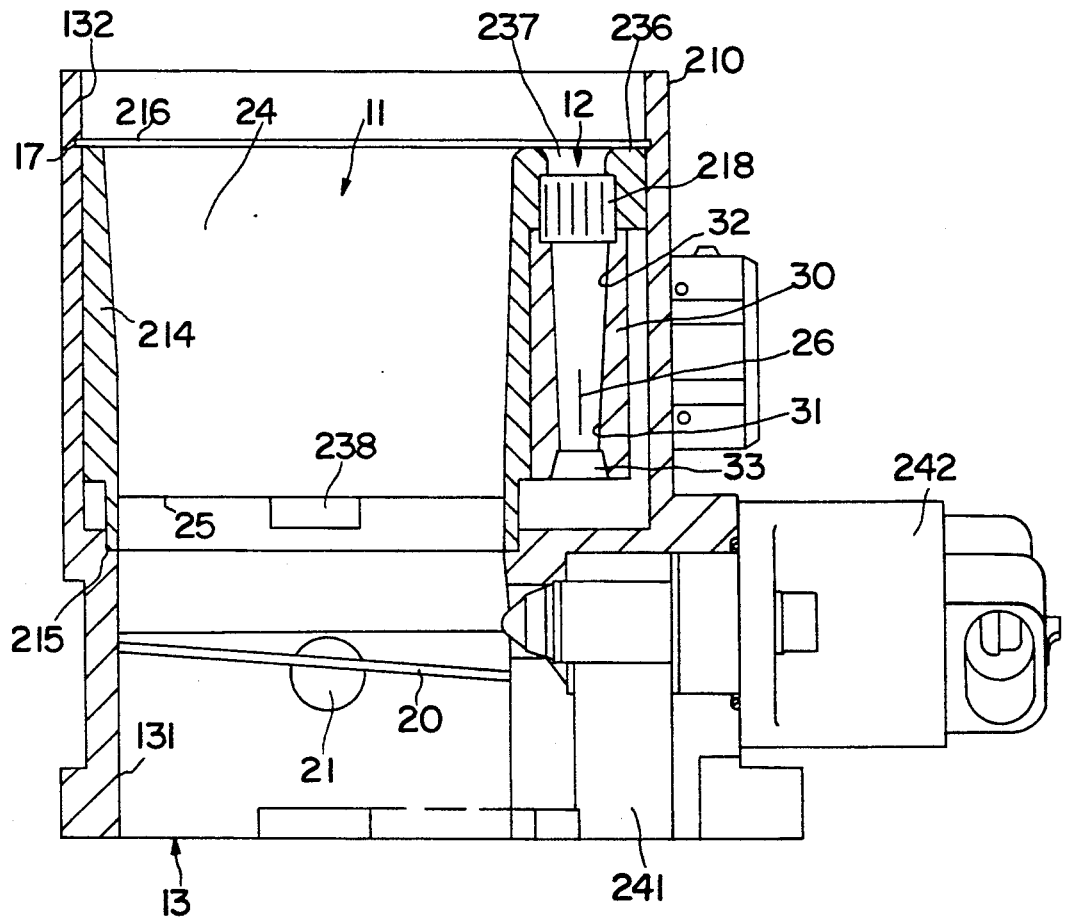
Figure 3:
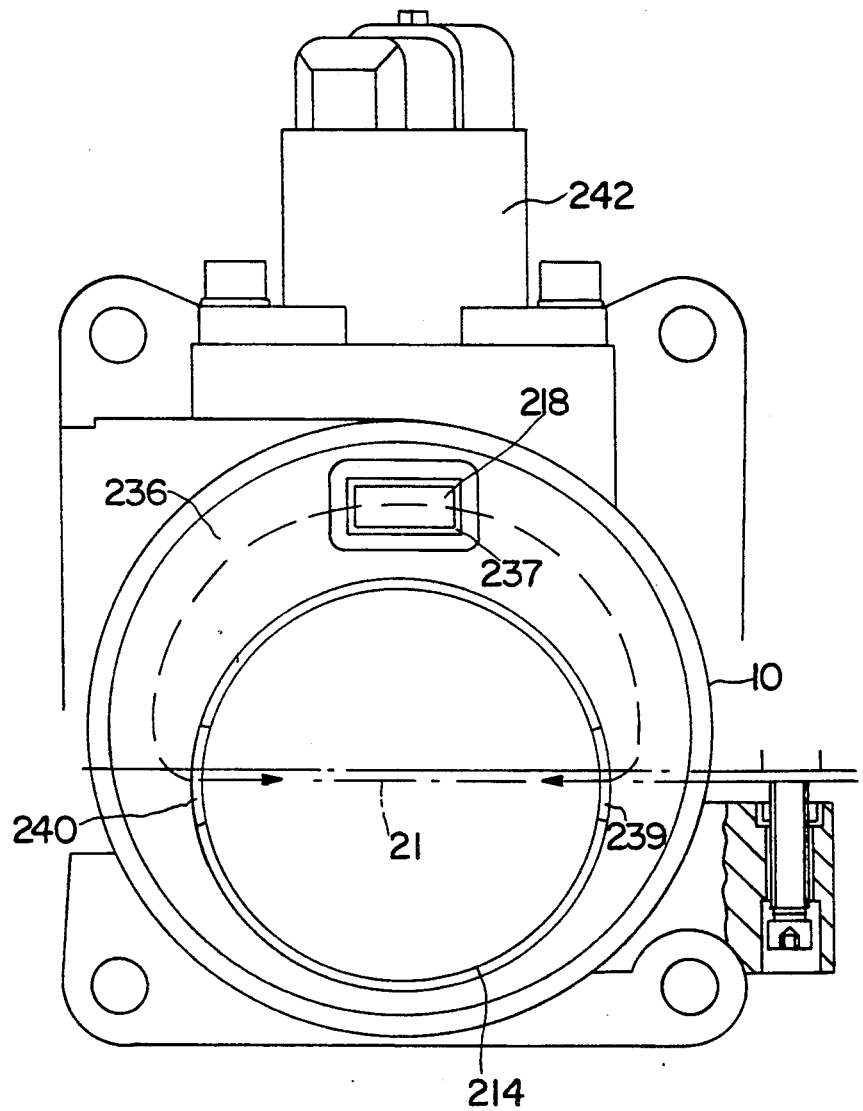

The invention is explained in greater detail in the description which follows, with reference to illustrative embodiments depicted in the drawing, in which:

FIGS. 1 and 2, each show a longitudinal section of an air-measuring device for an intake system of an internal combustion engine according to two illustrative embodiments, FIG. 3 shows a plan view of the air-measuring device in FIG. 2.

DESCRIPTION OF THE ILLUSTRATIVE EMBODIMENTS

In the air-measuring device to be seen in longitudinal section in FIG. 1, 10 denotes a so-called throttle body, in which a main Ilow channel 11 and a bypass channel 12 are formed. The -hrottle body 10 either forms part of the air intake pipe of an internal combustion engine or is connected to the latrer on the inlet side. On the outlet side, the throttle body 10 is attached to an intake manifold of the internal combustion engine.

To form main flow cnannel 11 and bypass channel 12, a through hole 13 is made in the throttle body 10, said hole consisting of two holes 131 and 132 arranged one after the other in the axial direction. Hole 132 has a larger diameter than hole 131 and is made eccentrically to the latter in the throttle body 10 so that the axes of the two holes 131,132 run parallel to one another with the eccentricity e. Inserted coaxially to hole 131 in hole 132 is a flow tube 14, which is supported at the front end against a stop face 15 in the transition between the holes 131,132 and is held in the axial direction by a retaining ring 16, which rests in a retaining groove 17 in the inlet region of the throttle body 10. A filter or a flow straightener 18 and a spacer ring 19 are furthermore clamped between retaining groove 17 and flow tube 14. Hole 131 and the flow tube 14, which is inserted coaxially to the latter and is smaller in diameter than the inside diameter of hole 132, together form the main flow channel 11, while the outer surface of the flow tube 14 delimits the bypass channel 12 together with the hole wall of hole 132. Arranged in the main flow channel 11, in the cylindrical region of bore 131, is a throttle valve 20, which is secured on an actuating shaft 21. The actuating shaft 21 is swivellably mounted in bearings 22,23 in the throttle body 10. The inner wall of the flow tube 14 is of venturi-shaped design and forms a venturi-shaped flow section in the main flow channel 11, referred to below as venturi section 24. This venturi section 24 has a minimum flow cross-section 25 at the end turned towards hole 131 and widens towards the inlet side of the throttle body 10.

Arranged in the bypass channel 12 is a temperaturedependent measuring resistor 26, which can be designed as a hot wire or hot film. The measuring resistor 26 is situated inside a carrier body 27, which is clamped between the flow tube 14 and the throttle body 10 and in each case rests in recesses 28,29 in the latter. Inserted into the carrier body 27 is an insert 30 which has a central portion 31, an adjoining inlet portion 32 upstream of it and an adjoining outlet portion 33 downstream of it. The inlet and outlet portion 32,33 widen frustoconically as the distance from the central portion 31 increases and end in an inlet opening 34 and outlet opening 35 respectively which are congruent with the channel cross-section of the bypass channel 12. The measuring resistor 26 is arranged centrally in the central portion 31. That channel portion 121 of the bypass channel 12 which is situated upstream of the carrier body 27 runs parallel to the main flow channel 11 and, like the latter, opens at the inlet of the flow tube 14. That channel portion 122 of the bypass channel 12 which is situated downstream of the carrier body 27 extends at an acute angle $\alpha$ to channel portion 121 and hence to the main flow channel 11, the direction of air flow at the mouth 43 of the bypass channel 12 in the main flow channel 11 thus enclosing an acute angle $\alpha$ with the direction of flow in the main flow channel 11. By means of this oblique exit angle $\alpha$, the noise component in the measurement signal picked up from the measuring resistor can be markedly reduced. This is evident, in particular, on comparison with a known air-measuring device in which channel portion 122 opens into the main flow channel 11 at right angles to the latter. An angle of inclination $\alpha$ of about 30° has proven advantageous.

To further reduce the noise component in the measurement signal of the measuring resistor 26, and to achieve a characteristic shape of the air-measuring device with sufficient resolution, the cross-sections of central portion 31, inlet opening 34 and outlet opening 35 of the insert 30 in the carrier body 27 are dimensioned as follows:

the ratio of the flow cross-section of the central portion 31 to the minimum cross-section 25 of the venturi section 24 is from 1:8 to 1:25, the ratio of the flow cross-section of the central portion 31 to the cross-section of the inlet opening 34 is from 1:1 to 1:2, with an angle of taper of the inlet portion 32 of from 0° to 8°, the ratio of the flow cross-section of the central portion 31 to the cross-section of the outlet opening 35 is from 1:1 to 1:2, with an angle of taper of the outlet portion 33 of from 0° to 30°.

The air-measuring device depicted in FIGS. 2 and 3 is modified slightly in relation to that described above but corresponds fundamentally to the latter in its structure and action. Identical components are therefore provided with identical references and, to the extent that they have been modified, are provided with a reference numeral incremented by 200.

The flow tube 214 again inserted into the through hole 13 with the mutually eccentric holes 131 and 132 of different diameters has a collar 236 on the inlet side in which an entrance opening 237 for the bypass channel 12 is made. The flow tube 214 is supported by the collar 236 against the hole wall of the hole 132 and, axially, is again supported against a stop face 215 between the two holes 131,132 and, in the axial direction, is again held by means of the retaining ring 16. The flow tube 214 with collar 236 and the hole wall of the hole 132 again delimit the bypass channel 12, which is connected to the main flow channel 11 in the smallest flow cross-section 25 of the venturi section 24 formed by the flow tube 214 or downstream of said cross-section via an exit opening 238, the axis of which extends at right angles to the axis of the throttle body 210. The insert 30 is inserted directly into the bypass channel 12, in particular such that its axis is in alignment with that of the entrance opening 237 and one of its front faces rests directly against the underside of the collar 236. In the insert 30, which again has a cylindrical central portion 31 and an inlet and outlet portion 32,33, each of frustoconical design, the measuring resistor 26 is inserted in the central portion 31. The flow straightener 218 is limited exclusively to the bypass channel 12 and inserted into the entrance opening 237, in the collar 236.

In order to exclude the influence of the different opening angles of the throttle valve 20 on the measured value signal, the exit opening 38 of the bypass channel 12 to the main flow channel 11 is arranged exactly over the swivelling axis 21 of the throttle valve 20, as seen in the direction of the axis of th.e main flow channel, and at a distance from the said swivelling axis. The cross-section of the exit opening 238 is here chosen to be 0.3 times the throttle valve diameter.

As indicated in FIG. 3, the bypass channel 12 can also be provided with two exit openings 239,240. In this case, the two exit openings 239,240 lie diametrically opposite to one another and, as seen in the direction of flow in the main flow channel 11, each exit opening 239,240 lies exactly over the actuating shaft 21 of the throttle valve 20, i.e. in a region which is always at a constant distance from the throttle valve 20, irrespective of the respective angular position of the latter. The cross-section of aach exit opening 239,240 is then 0.15 times the throttle valve diameter.

In the case of internal combustion engines with adaptive idling control, idling control is effected via a bypass 241 (FIG. 2), which is taken around the thorttle valve 20 and is controlled by a solenoid valve 242. The outlet of the bypass 241, which thus lies in a different plane to the exit opening 238 of the bypass channel 12, is arranged offset relative to the exit opening 238 in the circumferential direction.

What is claimed is:

1. Air-measuring device, in particular for measuring the air mass taken in by an internal combustion engine, comprising a throttle body (10), said throttle body (10) having an air inflow end (18) and an air outflow end (13) with a main flow channel (11) having a venturi-shaped flow section, a bypass channel, said bypass channel includes an input end open to said main flow channel upstream said venturi-shaped flow section air inflow end, said bypass has an output end which opens with a mouth in the main flow channel in the smallest flow cross-section of the venturi section, a temperature-dependent measuring resistor is arranged in the bypass channel, a channel region (30) delimited by an inlet opening (34) and an outlet opening (35) and having a central portion (31) accommodating the measuring resistor (26) is formed in said bypass, an adjoining inlet portion (32) is connected to said central portion and includes said inlet opening (34) and an adjoining outlet portion (33) is connected to said central portion and includes said outlet opening (35), the inlet and outlet openings (34,35), of said inlet portion and said outlet portion are congruent with the channel cross-section of the bypass channel (12), and the channel region (30) is designed in such a way that a ratio of the flow cross-section of the central portion (31) to the smallest flow cross-section (25) of the venturi section (24) is from 1:8 to 1:25 and the ratio of said flow cross-section to the cross-section of the inlet and outlet opening (34,35) connected to the central region (31) is in each case from 1:1 to 1:2.

2. An air measuring device according to claim 1, in which the inlet and outlet portions (32,33) of the channel region (30) are of frustoconical design and as the ratio of the flow cross-section of the central portion (31) to the cross-section of inlet opening (34) and outlet opening (35) increases, respectively, the angle of taper of the inlet portion (32) rises to up to about 8° and that of the outlet portion (35) to up to about 30°.

3. Air-measuring device according to claim 2, in which in the region of its mouth situated in the smallest flow cross-section (25) of the venturi section (24), the output end of the bypass channel (12) is designed in such a way that the direction of air flow at the mouth of the bypass encloses an acute angle ($\alpha$), preferably about 30°, relative to the direction of flow in the main flow channel (11).

4. An air measuring device according to claim 3, in which a throttle valve is arranged in the main flow channel, downstream of the mouth of the bypass channel which throttles an air flow, the throttle valve is rotated about a swivelling axis aligned transversely to an axis of the main flow channel, as seen in a direction of the axis of the main flow channel, the mouth (238) of the bypass lies exactly over the swivelling axis (21) of the thorttle valve (20) and at an axial distance from the swivelling axis which is larger than 0.3 times the throttle valve diameter.

5. An air measuring device according to claim 4, in which the mouth of the bypass is divided between two mouth locations (239, 240) situated diametrically opposite to one another.

6. An air measuring device according to claim 3, in which the mouth of the bypass is divided between two mouth locations (239, 240) situated diametrically opposite to one another.

7. An air measuring device according to claim 2, in which a throttle valve is arranged in the main flow channel, downstream of the mouth of the bypass channel which throttles an air flow, the throttle valve is rotated about a swivelling axis aligned transversely to an axis of the main flow channel, as seen in a direction of the axis of the main flow channel, the mouth (238) of the bypass lies exactly over the swivelling axis (21) of the throttle valve (20) and at an axial distance from the swivelling axis which is larger than 0.3 times the throttle valve diameter.

8. An air measuring device according to claim 7, in which the mouth of the bypass is divided between two mouth locations (239, 240) situated diametrically opposite to one another.

9. Air-measuring device according to claim 1 in which in a region of its mouth situated in the smallest flow cross-section (25) of the venturi section (24), the output end of the bypass channel (12) is designed in such a way that a direction of air flow at the mouth of the bypass encloses an acute angle ($\alpha$), preferably about 30°, relative to the direction of flow in the main flow channel (11).

10. An air measuring device according to claim 9, in which a throttle valve is arranged in the main flow channel, downstream of the mouth of the bypass channel which throttles an air flow, the throttle valve is rotated about a swivelling axis aligned transversely to an axis of the main flow channel, as seen in a direction of the axis of the main flow channel, the mouth (238) of the bypass lies exactly over the swivelling axis (21) of the throttle valve (20) and at an axial distance from the swivelling axis which is larger than 0.3 times the throttle valve diameter.

11. An air measuring device according to claim 10, in which the mouth of the bypass is divided between two mouth locations (239, 240) situated diametrically opposite to one another.

12. An air measuring device according to claim 1, in which a thorttle valve is arranged in the main flow channel downstream of the mouth of the bypass channel which throttles an air flow and is rotated about a swivelling axis aligned transversely to an axis of the main flow channel, as seen in a direction of the axis of the main flow channel, the mouth (238) of the bypass channel lies exactly over the swivelling axis (21) of the throttle valve (20) and at an axial distance from the swivelling axis which is larger than 0.3 times the throttle valve diameter.

13. An air measuring device according to claim 12, in which the mouth of the bypass is divided between two mouth locations (239, 240) situated diametrically opposite to one another.

14. Air-measuring device, in particular for measuring the air mass taken in by an internal combustion engine, comprising a throttle body (10), said throttle body (10) having an air inflow end (18) and an air outflow end (13) with a main flow channel (11) having a venturi-shaped flow section, a bypass channel (12), said bypass channel includes an input end open to said main flow channel upstream said venturi-shaped flow section air inflow end, said bypass has an output end which opens with a mouth in the main flow channel upstream the smallest flow cross-section of the venturi section, a temperature-dependent measuring resistor is arranged in the bypass channel, a channel region (30) delimited by an inlet opening (34) and an outlet opening (35) and having a central portion (31) accommodating the measuring resistor (26) is formed in said bypass, an adjoining inlet portion (32) is connected to said central portion and includes said inlet opening (34) and an adjoining outlet portion (33) is connected to said central portion and includes said outlet opening (35), the inlet and outlet openings (34,35), of said inlet portion and said outlet portion are congruent with the channel cross-section of the bypass channel (12), and the channel region (30) is designed in such a way that a ratio of the flow cross-section of the central portion (31) to a smallest flow cross-section (25) of the venturi section (24) is from 1:8 to 1:25 and the ratio of said flow cross-section to the cross-section of the inlet and outlet opening (34,35) connected to the central region (31) is in each case from 1:1 to 1:2.

15. Air-measuring device, in particular for measuring the air mass taken in by an internal combustion engine, comprising a throttle body (10), said throttle body (10) having an air inflow end (18) and an air outflow end (13) with a main flow channel (11) having a venturi-shaped flow section, a bypass channel (12), said bypass channel includes an input end open to said main flow channel upstream said venturi-shaped flow section air inflow end, said bypass has an output end which opens with a mouth in the main flow channel downstream of the smallest flow cross-section of the venturi section, a temperature-dependent measuring resistor is arranged in the bypass channel, a channel region (30) delimited by an inlet opening (34) and an outlet opening (35) and having a central portion (31) accommodating the measuring resistor (26) is formed in said bypass, an adjoining inlet portion 32) is connected to said central portion and includes said inlet opening (34) and an adjoining outlet portion (33) is connected to said centrla portion and includes said outlet opening (35), the inlet and outlet openings (34,35), of said inlet portion and said outlet portion are congruent with the channel cross-section of the bypass channel (12), and the channel region (30) is designed in such a way that a ratio of the flow cross-section of the central portion (31) to a smallest flow cross-section (25) of the venturi section (24) is from 1:8 to 1:25 and the ratio of said flow cross-section to the cross-section of the inlet and outlet opening (34,35) connected to the central region (31) is in each case from 1:1 to 1:2.

* * * * *